United States Patent
Rössner

(10) Patent No.: US 6,582,131 B2
(45) Date of Patent: Jun. 24, 2003

(54) CYLINDRICAL ROLLER BEARING

(75) Inventor: Sonja Rössner, Oberschwarzach (DE)

(73) Assignee: SKF GmbH, Schweinfurt (DE)

( * ) Notice: Subject to any disclaimer, the term of this patent is extended or adjusted under 35 U.S.C. 154(b) by 0 days.

(21) Appl. No.: 09/916,335

(22) Filed: Jul. 30, 2001

(65) Prior Publication Data

US 2002/0044708 A1 Apr. 18, 2002

(30) Foreign Application Priority Data

Jul. 31, 2000 (DE) .......................................... 200 13 305

(51) Int. Cl.$^7$ ................................................ F16C 33/46
(52) U.S. Cl. ...................................... 384/577; 384/572
(58) Field of Search ................................. 384/572, 577

(56) References Cited

U.S. PATENT DOCUMENTS

| 1,125,316 | A | * | 1/1915 | Heinzelman | 384/573 |
|---|---|---|---|---|---|
| 1,611,976 | A | * | 12/1926 | Williford | 384/573 |
| 2,033,074 | A | * | 3/1936 | Herrmann | 384/548 |
| 2,365,154 | A | | 12/1944 | Storz | |
| 4,239,304 | A | * | 12/1980 | Wakunami | 384/573 |
| 4,397,507 | A | * | 8/1983 | Kraus et al. | 384/576 |
| 4,428,628 | A | | 1/1984 | Brown | |
| 4,580,793 | A | * | 4/1986 | Bronson | 277/547 |
| 4,863,177 | A | * | 9/1989 | Rockwood et al. | 277/416 |
| 4,865,473 | A | * | 9/1989 | De Vito | 384/572 |
| 4,881,830 | A | * | 11/1989 | Shepard et al. | 384/523 |
| 5,178,474 | A | * | 1/1993 | Muntnich et al. | 384/572 |
| 5,702,187 | A | * | 12/1997 | Weigand et al. | 384/551 |
| 5,743,659 | A | * | 4/1998 | Stewart | 384/573 |
| 6,406,190 | B1 | * | 6/2002 | Yoon | 384/551 |

FOREIGN PATENT DOCUMENTS

| DE | 7016959 | 3/1972 |
|---|---|---|
| DE | 9003461 | 7/1990 |
| DE | 4244091 | 12/1993 |
| DE | 4425345 | 1/1996 |
| DE | 19736374 | 2/1999 |
| DE | 19839486 | 3/2000 |
| DE | 19855539 | 6/2000 |
| GB | 700126 | 7/1958 |

* cited by examiner

Primary Examiner—Douglas C. Butler
Assistant Examiner—Benjamin A Pezzlo
(74) Attorney, Agent, or Firm—Burns, Doane, Swecker & Mathis, LLP

(57) ABSTRACT

A cylindrical roller cage includes an outer race, and inner race, a plurality of rolling elements arranged between the outer race and the inner race, and at least one cage having a plurality of locating pockets corresponding to the number of rolling elements. The cage is ring-shaped and is arranged in a groove in the outer race or the inner race. The cage is interrupted at least at one circumferential breakpoint to define two ends of the cage at the breakpoint that form a connection having at least two cooperating elements which interact in a complementary manner by way of an undercut as viewed in the circumferential direction. The axial direction of the elements forms an angle of 15° to 75° with the circumferential direction or tangent to the circumference at the breakpoint.

21 Claims, 1 Drawing Sheet

CYLINDRICAL ROLLER BEARING

Figure 1:
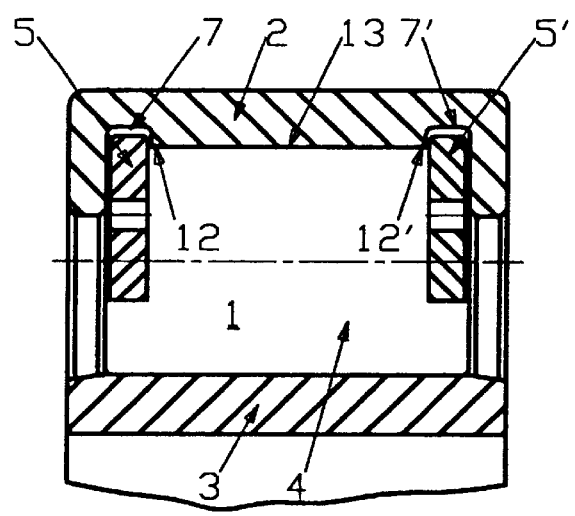

This application is based on and claims priority under 35 U.S.C. §119 with respect to German Application No. G 200 13 305.5 filed on Jul. 31, 2000, the entire content of which is incorporated herein by reference.

FIELD OF THE INVENTION

This invention generally relates to roller bearings. More particularly, the present invention pertains to a cylindrical roller bearing having an outer race, an inner race, a plurality of rolling elements arranged between outer race and inner race, and at least one cage having a number of locating pockets corresponding to the number of rolling elements.

BACKGROUND OF THE INVENTION

U.S. Pat. No. 4,428,628 discloses a cylindrical roller bearing possessing a split inner race construction. The two parts forming the inner race are axially assembled so that a groove is formed between them to receive the cage which is in the form of a disk. The cage guides the individual cylindrical rollers which on the outside are surrounded by the outer race.

The drawback associates with this cylindrical roller bearing, as well as many other cylindrical roller bearings, is that the outer race or the inner race must have a split construction to enable the cage to be mounted. This involves significant production costs as well as complexity in the assembly of the bearing.

Cage configurations in which the cage is assembled from individual segments are known. GB 799 126 discloses such a cage construction. Although using this type of cage in a cylindrical bearing makes it possible to construct the race which is provided with the groove as a single piece, it also involves the potential risk that the cage might crack under load at the joints.

A need thus exists for a cylindrical roller bearing that allows a one-piece construction of the outer or the inner race, while at the same time ensuring sufficient stability of the disk cage in operation.

SUMMARY OF THE INVENTION

According to one aspect of the invention, a cylindrical roller cage includes an outer race, and inner race, a plurality of rolling elements arranged between the outer race and the inner race, and at least one cage having a plurality of locating pockets corresponding to the number of rolling elements. The cage is ring-shaped and is arranged in a groove in the outer race or the inner race. The cage is interrupted at least at one circumferential point to define two ends of the cage at the breakpoint that form a hook-type connection having at least two cooperating hook elements which interact in a complementary manner by way of an undercut as viewed in the circumferential direction. The axial direction of the hook elements forms an angle of 15° to 75° with the circumferential direction at the breakpoint.

Thus, according to the present invention, a ring-shaped cage is provided with a hook-type connection by way of which the cage can be fixed after being mounted in the groove of the inner race or the outer race. With respect to its axial direction, the hook element is arranged in such a way that it lies against the cage at an angle to the tangent. Since detaching the hook connection thus requires shifting in both the radial and circumferential direction, the cage offers great resistance against accidental opening when the bearing is in operation.

The two ends of the cage can be configured in a way that permits the ends to be snapped together at the break point. Also, axially extending cross-holes can be formed in the cage and spaced apart along the circumference of the cage. These holes permit lubricant for the bearing to collect and/or can serve to discharge excess lubricant.

According to a preferred form of the invention, two ring-shaped cages are arranged in the peripheral area of the rolling elements adjacent opposite axial ends of the rolling elements. Advantageously, the junction between the raceway of the outer race or the inner race and the cage (or the groove formed in the inner or outer race) can be at least partially cambered to avoid stress concentration at the edges. This camber can be determined based on a so-called logarithmic profile as known in the art. The material for the proposed cage is preferably plastic or brass.

In accordance with another aspect of the invention, a cylindrical roller bearing includes an outer race, an inner race, a plurality of rolling elements arranged between the outer race and the inner race, and at least one annular cage having a plurality of locating pockets in which are positioned the rolling elements, with the cage being interrupted at least at one circumferentially located breakpoint to define two ends of the cage at the breakpoint. Each end of the cage has an engaging element, with the engaging element at one cage end engaging the engaging element at the other cage end to secure together the cage ends. The engaging elements extend in an axial direction forming an acute angle with a tangent to a circumference of the cage.

BRIEF DESCRIPTION OF THE DRAWING FIGURES

Figure 2:
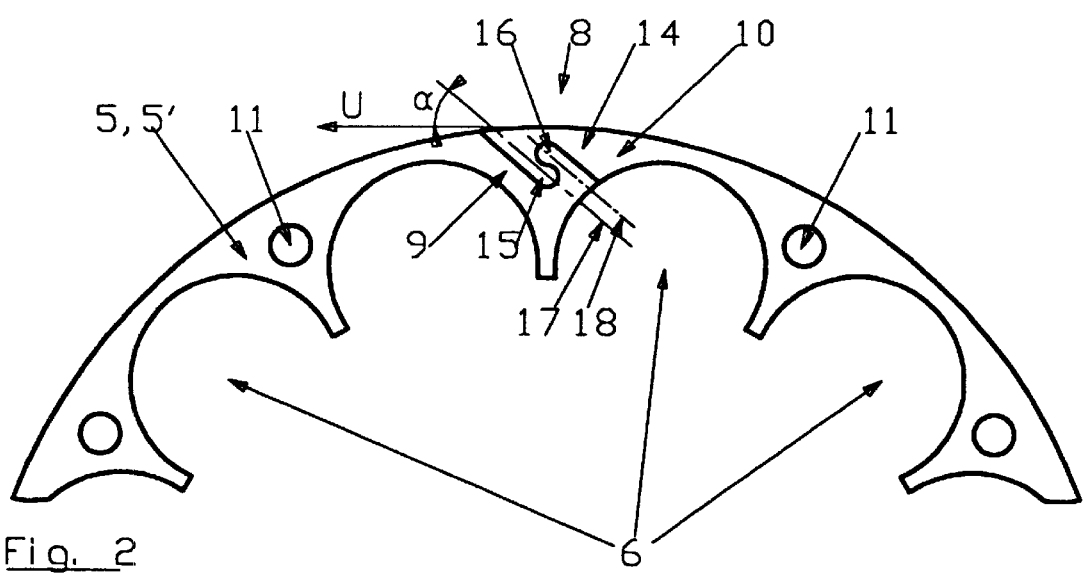

The foregoing and additional features and characteristics of the present invention will become more apparent from the following detailed description considered with reference to the accompanying drawing figures in which like reference numerals designate like elements and wherein:

FIG. 1 is a cross-sectional view through a cylindrical roller bearing in accordance with the present invention, and FIG. 2 is a side view of the ring-shaped cage used in the roller bearing shown in FIG. 1.

DETAILED DESCRIPTION OF THE INVENTION

Referring initially to FIG. 1, the roller bearing according to the present invention is in the form of a cylindrical roller bearing 1 having an outer race 2, an inner race 3, and a plurality of cylindrical rolling elements 4 arranged in the space between the outer and inner races 2, 3. The rolling elements 4 are guided and spaced apart by two ring-shaped cages 5, 5'. The outer race 2 of the bearing possesses a raceway 13 and is provided with a pair of grooves 7, 7' each adapted to receive and guide one of the cages 5, 5'. The inner race 3 also possess a raceway.

To facilitate optimal running behavior of the bearing while at the same time avoiding stress concentration at the edges of the rolling elements 4, the raceway 13 of the outer race 2 is slightly cambered in the junction areas 12 near the cages 5, 5'. That is, in the junction areas of the outer race raceway 13 and the grooves 7, 7', the outer race raceway 13 is cambered. This camber can be based on a logarithmic profile in a manner known in the art.

The configuration of the ring-shaped cages 5, 5' is illustrated in FIG. 2. As illustrated, each cage 5, 5' has a plurality of locating pockets 6 that are adapted to receive the individual rolling elements 4. The number of locating pockets corresponds to the number of rolling elements 4. In addition, axially extending cross-holes 11 are formed in the cages 5, 5' to serve as lubricant bores in which lubricant can collect for cage lubrication. These cross-holes can also serve to discharge excess lubricant.

Each annular-shaped or ring-shaped cage 5, 5' is interrupted at a breakpoint 8 along the cage circumference. This breakpoint 8 forms two cage ends 9, 10 in the cage. These cage ends 9, 10 are configured to provide a connection 14 between the cage ends 9, 10. The connection 14 is in the form of an engaging connection that includes two engaging elements 15, 16. The connection 14 associated with the illustrated embodiment of the bearing shown in FIG. 2 is a hook-type connection defined by two hook elements 15, 16, with one of the hook elements being provided on each of the cage ends 9, 10. The two hook elements 15, 16 are geometrically complementary to one another to permit them to be mated together, for example by snapping them together. As shown in FIG. 2, the hook elements 15, 16 can be configured to have head-type end sections (i.e., slightly enlarged ends). The hook elements 15, 16 have an elongated, somewhat bar-shaped configuration defining an extension in the axial direction 17, 18. The elongated extensions extending in the indicated axial directions 17, 18 are arranged parallel to one another in the assembled state of the cage. Thus, the one cage end 9 includes the elongated axially extending element 15 and an adjoining groove that receives the elongated element 16 from the other cage end. Similarly, the other cage end 10 includes the elongated axially extending element 16 and an adjoining groove that receives the elongated element 15 from the one cage end 9.

In the assembled state, the directions 17, 18 of axial extension of the elements 15, 16 form an acute angle $\alpha$ with a tangent U to the circumference of the cage at the point where the axial extension intersects the cage circumference. In accordance with the present invention, this angle $\alpha$ is preferably between 15° and 75°, more preferably between 30° and 60°.

If the connection 14 is designed so that the angle $\alpha$ is 45°, radial and circumferential shifting of the ends 9, 10 of the cage 5, 5' is required to the same degree in order to detach or disconnect the hook-type connection 14. Because such simultaneous shifting in the circumferential and radial direction is extremely unlikely during normal operation of the cage, the connection between the cage sections is highly resistant to accidental detachment.

The cage can be made of suitable materials, including plastic material and metal material such as brass. If the cage is made of, for example, brass, the two cooperating hook elements 15, 16 can be configured to possess smooth or generally straight sides. That is, the hook elements can be configured without the head-shaped end segments depicted in FIG. 2. Due to the angled arrangement of the elements as viewed in the circumferential direction, this too provides an undercut which prevents accidental detachment of the cage in the assembled state of the bearing.

In accordance with the present invention, the cylindrical roller bearing can be fabricated, if desired, so that the outer race and/or inner race are of a one-piece construction, while at the same time ensuring sufficient stability of the disk cage in operation.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A cylindrical roller bearing, comprising
   an outer race;
   an inner race;
   a plurality of rolling elements arranged between the outer race and the inner race;
   at least one cage having a plurality of locating pockets corresponding to the number of rolling elements;
   the cage being configured in a shape of a ring and being arranged in a groove in the outer race or the inner race;
   the cage being interrupted at least at one circumferentially located breakpoint to define two ends of the cage at the breakpoint, the two ends of the cage forming a hook-type connection having at least two cooperating hook elements which interact in a complementary manner by way of an undercut as viewed in a circumferential direction; and
   the hook elements extending in an axial direction forming an angle with a tangent to a circumference of the cage, the angle being between 15° and 75°.

2. The cylindrical roller bearing as claimed in claim 1, wherein the angle is between 30° and 60°.

3. The cylindrical roller bearing as claimed in claim 1, wherein the two ends of the cage are configured in such a way that they can be snapped together at the breakpoint.

4. The cylindrical roller bearing as claimed in claim 3, including a plurality of cross-holes passing through the cage and spaced apart from one another along the circumference of the cage.

5. The cylindrical roller bearing as claimed in claim 4, wherein said cage is a first cage, and including a second ring-shaped cage arranged in a second groove in the outer race or inner race.

6. The cylindrical roller bearing as claimed in claim 5, wherein the outer race and the inner race both include a raceway, a junction between each groove and the raceway of the race in which the grooves are formed being cambered.

7. The cylindrical roller bearing as claimed in claim 5, wherein the cages are made of plastic.

8. The cylindrical roller bearing as claimed in claim 5, wherein the cages are made of brass.

9. The cylindrical roller bearing as claimed in claim 1, including a plurality of cross-holes passing through the cage and spaced apart from one another along the circumference of the cage.

10. The cylindrical roller bearing as claimed in claim 1, wherein said cage is a first cage, and including a second cage possessing a ring shape and arranged in a second groove in the outer race or inner race.

11. The cylindrical roller bearing as claimed in claim 10, wherein the cages are made of plastic.

12. The cylindrical roller bearing as claimed in claim 10 wherein the cages are made of brass.

13. The cylindrical roller bearing as claimed in claim 1, wherein the outer race and the inner race both include a raceway, a junction between the groove and the raceway of the race in which the groove is formed being cambered.

14. A cylindrical roller bearing comprising an outer race;

an inner race;

a plurality of rolling elements arranged between the outer race and the inner race;

at least one annular cage having a plurality of locating pockets in which are positioned the rolling elements;

the cage being interrupted at least at one circumferentially located breakpoint to define two ends of the cage at the breakpoint, each end of the cage having an engaging element, with the engaging element at one cage end engaging the engaging element at the other cage end to secure together the cage ends; and the engaging elements extending in an axial direction forming an acute angle with a tangent to a circumference of the cage.

15. The cylindrical roller bearing as claimed in claim 14, wherein the cage possesses a disc-shaped configuration and is arranged in a groove in the outer race or the inner race.

16. The cylindrical roller bearing as claimed in claim 14, wherein the angle is between 15° and 75°.

17. The cylindrical roller bearing as claimed in claim 14, including a plurality of cross-holes passing through the cage and spaced apart from one another along the circumference of the cage.

18. The cylindrical roller bearing as claimed in claim 14, wherein said cage is a first cage, and including a second ring-shaped cage arranged in a groove in the outer race or inner race, the second cage being interrupted at least at one circumferentially located breakpoint to define two ends of the second cage at the breakpoint, each end of the second cage having an engaging element.

19. The cylindrical roller bearing as claimed in claim 14, wherein the cage is positioned in a groove in the outer race or inner race, the inner and outer races each having a raceway, a junction between groove and the raceway of the race in which the groove is formed being cambered.

20. The cylindrical roller bearing as claimed in claim 14, wherein the cage is made of plastic.

21. The cylindrical roller bearing as claimed in claim 14, wherein the cage is made of brass.

* * * * *